Oct. 19, 1943.  M. F. DUFFY  2,332,064
THROTTLE CONTROLLER FOR AUTOMOTIVE VEHICLES
Filed Jan. 8, 1943
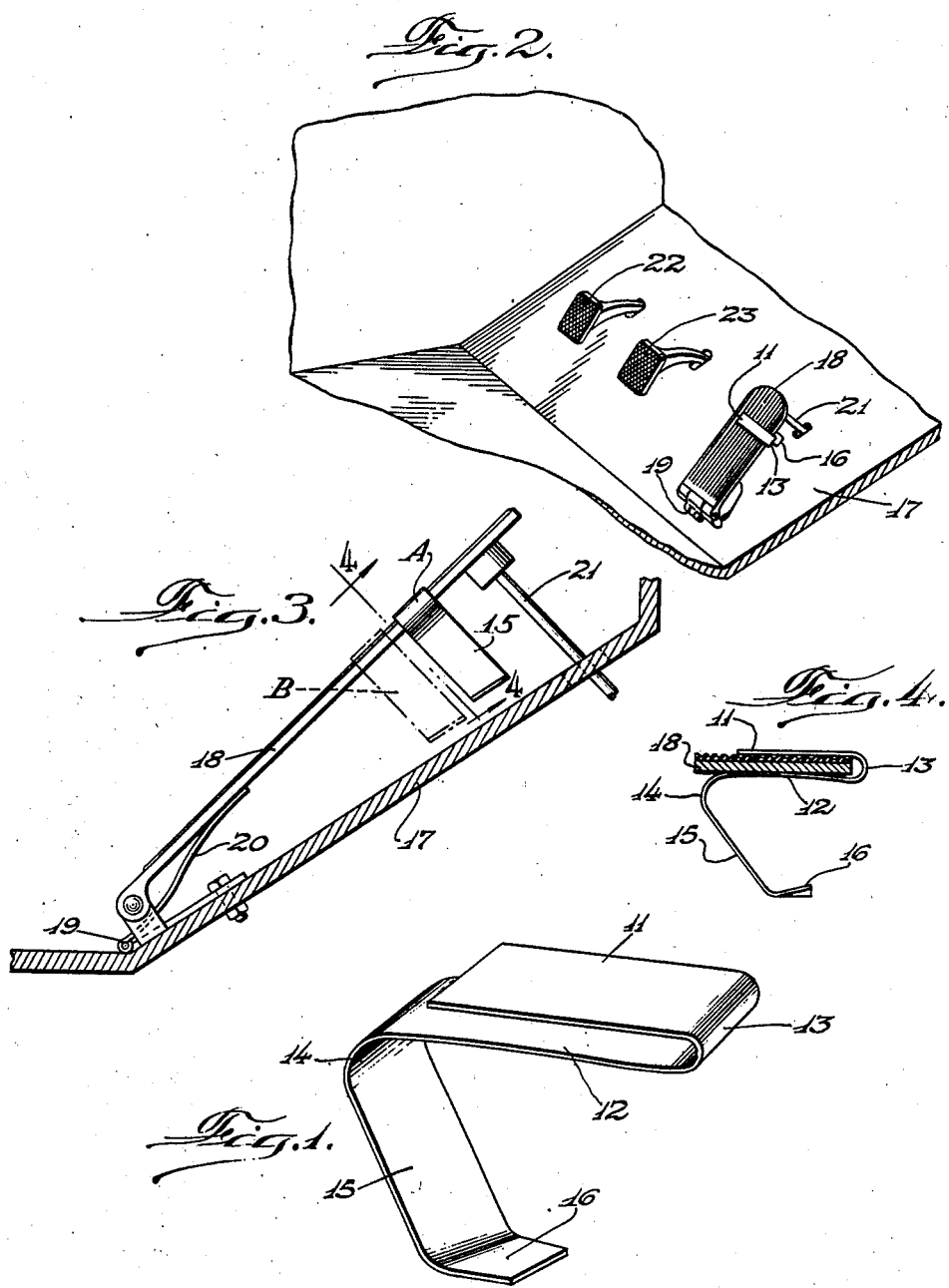
Inventor:
Maurice F. Duffy
By Williams, Bradbury & Hinkle
Attorneys.

Patented Oct. 19, 1943

2,332,064

UNITED STATES PATENT OFFICE 2,332,064

THROTTLE CONTROLLER FOR AUTOMOTIVE VEHICLES

Maurice F. Duffy, Chicago, Ill.

Application January 8, 1943, Serial No. 471,695

3 Claims. (Cl. 74—526)

My invention relates to a differential controller for an automotive vehicle. I have found it convenient to call it a "speed-minder."

The object of my invention is, in general, to provide the throttle controlling pedal or "accelerator" of an automobile or other automotive vehicle with an attachment for automatically and differentially controlling the speed of the vehicle by differentially controlling the throttle and, therefore, the speed of the internal combustion engine which supplies the power for driving the vehicle.

It is the current and customary practice to provide an automobile with an "accelerator" pedal which is either flat or substantially so. This accelerator pedal is mechanically connected with the throttle of the internal combustion engine. A spring or springs tend to return and hold the throttle in the "idling" position, i. e., almost completely closed. When the throttle is "at idle," the associated accelerator pedal is pushed and held in its uppermost position—usually a few inches above the floor board of the driving compartment. More often than not, the pedal is pivotally mounted, as, for example, by a hinge at its lower and nearer end. The driver opens the throttle of the engine to a greater or less degree by pushing the accelerator pedal downwardly to a greater or less extent from its position of rest.

Under given conditions of road, incline, wind, etc., the power developed by the engine, and consequently the speed of the automobile, will depend upon the extent to which the accelerator pedal is pushed downwardly from its normal idling position. To drive at a given speed on a uniform level road, it is necessary for the driver with his foot to push and hold the accelerator pedal at a given position—ordinarily a position somewhere between that of "idle" and that of wide open throttle. If, on such a level road, it is the desire of the driver to drive his car at a uniform speed of thirty-five miles per hour, as under present wartime conditions, it is necessary for the driver to hold the accelerator pedal steadily at some such intermediate position against the tendency of a spring or springs to return the accelerator pedal to its idle position. With the conventional arrangements, this is difficult and tiresome, particularly in the case of any long continued driving.

These difficulties have heretofore been recognized and various people have devised mechanisms or attachments intended to facilitate the holding of an accelerator pedal at a given driving position, but in such a way that the effect of the limiting device or mechanism could be temporarily overcome, as, for example, in climbing a hill or passing another vehicle. Several of these previously proposed or marketed devices have incorporated what might be called an accelerator pedal stop. When the pedal has been pushed downwardly from its idling position to a given extent, the stop would be engaged, thereby limiting the downward movement of the pedal and, therefore, determining the extent to which the engine throttle was opened, and thereby roughly the power developed by the engine. These stops have been provided with spring supports of a character such that the exertion of a considerably increased pressure of the foot upon the accelerator pedal would overcome the force of the stop supporting spring, whereupon the accelerator pedal could be pushed into a more widely open throttle position than that represented by the point at which the pedal or its associated mechanism engaged the stop. The result was that a driver could put his foot on the accelerator pedal and push it down until it engaged the intermediate stop. The stop would ordinarily prevent the pedal from being pushed beyond this intermediate position, e. g., the thirty five mile per hour position. But in case of ascending a hill or requiring a spurt of increased speed, the driver could push harder on the accelerator pedal, thereby overcoming the effect of the spring supported stop and correspondingly increasing the throttle opening. Examples of these previously proposed or marketed devices are described in Rodgers Patent No. 2,145,665 of January 31, 1939, Liley Patent No. 2,165,897 of July 11, 1939, Weintraub Patent No. 2,240,919 of May 6, 1941, Gillespie Patent No. 2,295,897 of September 15, 1942, and the advertisement of the B. F. Goodrich Company of Akron, Ohio, on page 7 of the December 12, 1942, issue of the Saturday Evening Post.

The specific object of my invention is to provide a device of this general character and purpose but very much simpler and cheaper in construction, and very much simpler and easier to install and adjust than any which has come to my attention.

The "speed-minder" attachment of my invention might be briefly and generally described as a strip of spring metal, one end of which is bent into a U-shaped spring clip which may be slipped over the edge of a more or less flat accelerator pedal, thereby holding the attachment to, and in a given position on, the accelerator pedal, and the other end of which is bent into a spring foot projecting downwardly from the spring clip into the space between the pedal and the floor board. The lower end of the spring foot may conveniently be provided with a shoe for engaging the floor board or the carpet on the floor board by a further bend of the metal at the lower end of the foot. The spring foot and its shoe do not engage the floor board or the carpet when the pedal is in its idling position. But when the pedal is pushed down to what might be called the thirty five mile per hour position, the spring foot or its shoe will engage the floor board or its carpet, thereby differentially limiting the downward movement of the accelerator pedal under the pressure of the driver's foot. The application of a considerably increased foot pressure will, however, overcome the limiting effect of the spring foot and permit the pedal to be pushed beyond the thirty five mile position, and indeed all the way to the wide open throttle position. This wider opening of the throttle will entail a bending of the spring foot against the tendency of the spring foot to maintain itself in the shape given to it by its initial "set." It is the force required to overcome this initial set of the spring foot which provides the driver with a differential limit—a limit to which he can easily and certainly push and hold the accelerator pedal, except as in emergencies he may desire to push the pedal to a position beyond that indicated by the differential limit.

This presentation of the matter may not be theoretically or scientifically quite accurate, but to all practical intents and purposes, the driver of an automobile can push his accelerator pedal to the point at which the spring foot engages the floor board, whereupon his car will run at a speed of, say, thirty five miles per hour. He will at this position find a substantial rest for his foot, and he will find that ordinarily it is an easy matter to hold the pedal substantially steadily in the position determined by the engagement of the spring foot with the floor board. The driver will find that in the case of an emergency or in climbing a hill, he can push the accelerator pedal beyond the position at which the spring foot first engages the floor board, and thus temporarily (or, indeed, continuously with some additional effort) attain any desired increase of speed up to the limit of the power of the engine and under the conditions of road, wind, etc.

Different makes of automobile, and indeed automobiles of the same make and model, will require that the spring foot be located at different positions with respect to the accelerator pedal and the floor board. The spring clip of my "speed-minder" enables the device to be pushed upwardly or downwardly on the pedal and into a position at which the spring foot will first engage the floor board or its carpet when the desired speed of, say, thirty five miles per hour is attained. This provides a simple and effective adjustment—not only to meet the peculiar conditions of different automobiles, but also to meet different speed limiting requirements, as, for example, twenty five miles per hour, or thirty miles per hour, or fifty miles per hour, rather than thirty five miles per hour.

Still furthermore, the "speed-minder" of my invention can be clipped to the accelerator pedal of an automobile in a moment and by any layman driver. No tools are required—no mechanic is required either in making the original installation on a standard automobile or in making or changing adjustments to meet the peculiarities of a given automobile or differing road conditions, as, for example, between smooth concrete and loose gravel. Indeed, the layman driver of an automobile can in a moment shift the position of the spring clip and the associated foot with respect to the accelerator pedal in such a way as daily or hourly to meet differing road conditions or differing speed limiting requirements.

The low cost and simplicity of installation and adjustment to which I have referred will be more readily understood by reference to the accompanying drawing, in which:

Fig. 1 is a perspective view of my "speed-minder" attachment in its entirety;

Fig. 2 is a perspective view of a conventional automobile floor board showing the "speed-minder" in position on the accelerator pedal;

Fig. 3 is a side view of a conventional accelerator pedal showing the "speed-minder" clipped in position upon it and indicating in dotted lines a second position corresponding with an adjustment for a different speed or a different road condition; and Fig. 4 is a cross-sectional view taken on the plane 4—4 as indicated in Fig. 3.

Not much need be said in explanation of the complete "speed-minder" attachment, as shown in Fig. 1. I have found it very satisfactory to bend a strap-shaped strip of spring metal into the form shown in this figure, using strap about seven-eighths of an inch wide and about one-thirty second of an inch thick—the bending being done before the convolutions are set in their final form by appropriate hardening and tempering. The strap forming the upper part of the attachment is bent into the form of a U-shaped spring clip, represented by the clamping jaws 11 and 12 and the U-shaped bend at 13. The left-hand end of the jaw 12 is bent downwardly, as indicated at 14, to provide the spring foot 15. I have found it desirable to bend the lower end of the spring foot a little further to form a shoe 16 so that the lower end of the foot will slide easily on the floor board or floor board carpet in case it is desired to push the pedal beyond the position at which the spring foot or its shoe first engages the floor board. As indicated in the drawing, this foot is not quite parallel with the jaws of the spring clip, but is inclined at an angle corresponding with the angular relationship between the floor board and the accelerator pedal.

I have found that I can make these "speed-minder" attachments of a more or less standard or uniform conformation with the bottom of the spring foot 15 or its shoe 16 about two inches below the jaw 12 of the spring clip 11, 13, 12.

This standardization can be effected because of the facility with which the "speed-minder" attachment can be shifted into such a position on the accelerator pedal that the bottom of the spring foot will engage the floor board at a car speed of exactly or approximately thirty five miles per hour (or any other desired normal speed).

In Fig. 3, I have indicated the inclined floor board of an automobile at 17. The more or less flat foot rest of the accelerator pedal is indicated at 18. The hinge or pivot of the accelerator pedal is indicated at 19 and a pedal retracting spring is indicated at 20. The rod by which the motion of the pedal is transmitted to the throttle of the engine carburetor is indicated at 21.

When the "speed-minder" attachment is located at the position shown in full lines at A, a certain downward movement of the pedal will cause the bottom of the spring foot to engage the floor board, whereupon the differential limitation upon the downward movement of the accelerator pedal will be interposed. When, however, the position of the "speed-minder" attachment is shifted to that indicated in dotted lines at B, then a lesses angular movement of the accelerator pedal in a downward direction will cause the bottom of the spring foot or its shoe to engage the floor board and to arrest differentially the downward movement of the accelerator pedal under the pressure of the driver's foot. Fig. 3 may perhaps sufficiently indicate that the "speed-minder" attachment is normally held in the desired position upon the accelerator pedal by the spring engagement of the pedal between the two jaws 11 and 12 of the spring clip. The position of the "speed-minder" attachment upon the pedal can be altered in consonance with the detailed construction and location of the accelerator pedal and the floor board as it may appear in different automobiles of the same or of different makes.

The grip of the spring clip of the "speed-minder" around and upon the accelerator pedal is, if need be, more clearly shown in Fig. 4 where the same reference characters are applied as in Figs. 1 and 2.

In Fig. 2, the floor board is indicated at 17, the accelerator pedal at 18, its hinge or pivot at 19, and the throttle rod at 21. To complete to some extent the indication of an automobile floor board and its equipment, I have indicated the customary clutch pedal at 22 and the customary brake pedal at 23. In this Fig. 4, the upper jaw of the spring clip of the "speed-minder" is indicated at 11 and the shoe at the bottom of the spring foot appears at 16.

Having described my invention and having indicated its simplicity and low cost of construction and the facility with which it can be installed and adjusted or readjusted to meet the varying conditions of appropriate use, I claim:

1. A "speed-minder" for differentially limiting the speed of an automotive vehicle having a flat throttle operating accelerator pedal pivoted at one end, comprising a spring foot adapted for interposition between the pedal and the adjacent floor board, and a spring clip adapted for attachment to the pedal at various distances from the pivot of the pedal to adjust the degree of angular movement of the pedal before the spring foot engages the floor board.

2. A "speed-minder" for differentially limiting the speed of an automotive vehicle having a flat throttle operating accelerator pedal pivoted at one end, comprising a spring foot adapted for interposition between the pedal and the adjacent floor board, and a spring clip adapted for attachment to the pedal at various distances from the pivot of the pedal to adjust the degree of angular movement of the pedal before the spring foot engages the floor board, the spring foot and the spring clip being formed of a single piece of flat metal ribbon.

3. In an automobile having a pivotally mounted and substantially flat throttle operating accelerator pedal, a U-shaped spring clip which may be clamped to the pedal at various distances from the pivot of the pedal, and a resilient foot piece formed integrally with the spring clip and extending part way from the pedal to the associated floor board when the pedal is released to its "idling" position, the foot having a shoe adapted to engage the floor board, and the clip, foot and shoe all being formed of flat spring metal bent into the form of clip, foot and shoe.

MAURICE F. DUFFY.